United States Patent
Zömbik

(10) Patent No.: US 9,960,923 B2
(45) Date of Patent: May 1, 2018

(54) HANDLING OF DIGITAL CERTIFICATES

(71) Applicant: Telefonaktiebolaget L M Ericsson (publ), Stockholm (SE)

(72) Inventor: László Zömbik, Zalaegerszeg (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 102 days.

(21) Appl. No.: 14/766,573

(22) PCT Filed: Mar. 3, 2013

(86) PCT No.: PCT/EP2013/054322
§ 371 (c)(1),
(2) Date: Aug. 7, 2015

(87) PCT Pub. No.: WO2014/135195
PCT Pub. Date: Sep. 12, 2014

(65) Prior Publication Data
US 2015/0381374 A1    Dec. 31, 2015

(51) Int. Cl.
*G06F 21/33* (2013.01)
*H04L 9/32* (2006.01)

(52) U.S. Cl.
CPC .................................. *H04L 9/3268* (2013.01)

(58) Field of Classification Search
None
See application file for complete search history.

(56) References Cited

U.S. PATENT DOCUMENTS 6,192,130 B1    2/2001 Otway
6,853,988 B1 *  2/2005 Dickinson ............... G06F 21/32
                                                        380/277

(Continued)

OTHER PUBLICATIONS

Kouril D., et al. "A Robust and Efficient Mechanism to Distribute Certificate Revocation Information Using the Grid Monitoring Architecture," International Conference on Advanced Information Networking and Applications Workshops, 2007, AINAW '07, IEEE, Niagara Falls, Ontario, Canada, May 21, 2007, pp. 614-619.

*Primary Examiner* — Brandon S Hoffman
(74) *Attorney, Agent, or Firm* — Coats & Bennett, PLLC

(57) ABSTRACT

A method for handling digital certificates in a communication network is described. The communication network comprises a first certificate authority (110-116) having issued at least one digital certificate. The method comprises determining (216) whether a revocation condition for revoking the at least one digital certificate is fulfilled. The at least one digital certificate has been issued by the first certificate authority, wherein the at least one digital certificate is valid and is not revoked. The method further comprises, based on a result of the step of determining (216), revoking (404), by the first certificate authority (110-116), the at least one digital certificate, and based on the result of the step of determining (216), issuing, by a second certificate authority (110-116), at least one further digital certificate for the revoked at least one digital certificate. An associated system, methods in involved network entities, the involved network entities, and computer programs are also described. Therefore security handling in the communication network which may be fluctuating with respect to its number of network nodes and/or which may comprise numerous network nodes may be performed in an easy and efficient way.

29 Claims, 8 Drawing Sheets

(56) References Cited

U.S. PATENT DOCUMENTS

| | | | |
|---|---|---|---|
| 2004/0049687 A1* | 3/2004 | Orsini | G06F 21/31 |
| | | | 713/189 |
| 2004/0168056 A1* | 8/2004 | Dillaway | G06F 21/10 |
| | | | 713/156 |
| 2007/0294526 A1 | 12/2007 | Medvinsky et al. | |
| 2009/0097661 A1* | 4/2009 | Orsini | H04L 9/083 |
| | | | 380/279 |

* cited by examiner

HANDLING OF DIGITAL CERTIFICATES

TECHNICAL FIELD

The present invention relates to telecommunications and in particular to methods, nodes and compseuter programs for handling digital certificates.

BACKGROUND

A trend in the upcoming generation of communication networks shows that network nodes can provide high-speed network access in a relatively small area only. Therefore a number of such network nodes in a communication network is expected to be high. For example, a communication network will comprise numerous nano- and pico-base stations, and associated supporting Internet Protocol (IP) connectivity nodes. Supporting IP connectivity nodes aggregate the traffic from several base stations and connect them to an IP transport network.

As these network nodes are in large quantity, a configuration and management of a node of these network nodes should be as automated as possible. The configuration and management of the network node should be simple, and only the actual physical installation and removal of the node should require on-site support. Moreover the network nodes should maintain their security by themselves. As the subscribers' needs continuously changes, the communication network also is continuously evolving. Network nodes are added and other network nodes are decommissioned. Network nodes may also break down over time. As a result, a typical communication network is expected to be highly fluctuating.

The network nodes are placed in an unsecure environment comprising several menacing risks such as physical access or active man-in-the-middle attacks. Accordingly, the already large number of network nodes is not only dynamically fluctuating, but also security threatening attacks are further increasing this dynamism.

To prevent that an attacker gains access to some part of the communication network, nodes need to be authenticated. In the above mentioned scenario, a usage of certificates is a beneficial method for identification. The digital certificates are issued by trusted Certificate Authorities (CA) which are usually situated in the Network Management Systems (NMS). If a network node is suspected to be compromised, a certificate can be invalidated and thus be revoked. The certificate of the compromised network node is placed on a Certificate Revocation List (CRL) which is maintained by the associated CA having issued the digital certificate. The CRL is downloaded, and is verified by the network nodes to identify which are the invalidated certificates. The network nodes also usually store a list of trusted CAs, in order to identify whether or not a CA is trusted.

Usually, a lifetime of a CA in a communication network is set to several years. Therefore the CRL of the CAs will grow over time, and may become extensively large. Thus a retrieval, storage and processing of the CRL will become resource consuming, especially for small processing network nodes such as pico-, nano-base stations and for associated supporting IP connectivity nodes. Further, a signaling load in the communication network may be high during the retrieval of the CRL.

SUMMARY

It is an object of the invention to provide measures with which security handling in a communication network which is fluctuating with respect to its number of network nodes and/or which comprises numerous network nodes may be performed in an easy and efficient way. It is also an object of the invention to provide corresponding methods, nodes, computer programs, and a corresponding system.

The objects defined above are solved by the features of the independent claims. Preferred embodiments of the invention are described in the dependent claims.

According to an exemplary aspect of the invention, a method for handling digital certificates in a communication network is provided. The communication network comprises a first certificate authority having issued at least one digital certificate. The method comprises determining whether a revocation condition for revoking the at least one digital certificate is fulfilled. The at least one digital certificate has been issued by the first certificate authority, and the at least one digital certificate is valid and is not revoked. The method comprises, based on a result of the step of determining, revoking, by the first certificate authority, the at least one digital certificate. The method comprises, based on the result of the step of determining, issuing, by a second certificate authority, at least one further digital certificate for the revoked at least one digital certificate.

The method may further comprise, prior to the step of determining, determining whether a trust relation addition condition for adding a trust relating in at least one network node of the communication network to the second certificate authority is fulfilled. The method may also comprise, based on a result of determining whether the trust relation addition condition is fulfilled, establishing a trust relation in the at least one network node of the communication network to the second certificate authority.

According to another exemplary aspect of the invention, a method in a controlling certificate authority for handling digital certificates in a communication network is provided. The controlling certificate authority comprises first and second certificate authorities. The first certificate authority has issued at least one digital certificate. The method comprises determining whether a revocation condition for revoking the at least one first certificate is fulfilled. The at least one digital certificate has been issued by the first certificate authority, and the at least one digital certificate is valid and is not revoked. The method comprises, based on a result of the step of determining, initiating the first certificate authority to revoke the at least one digital certificate. The method comprises, based on the result of the step of determining, initiating the second certificate authority to issue at least one further digital certificate for the revoked at least one digital certificate.

The method may comprise receiving from a network node of the communication network a request for issuing the at least one further digital certificate. The step of initiating the second certificate authority to issue the at least one further certificate may be performed in response to the received request. The method may also comprises sending the issued at least one further digital certificate to the at least one network node.

According to another exemplary aspect of the invention, a method in a network node for handling digital certificates in a communication network is provided. The network node maintains a digital certificate having been issued by a first certificate authority of the communication network. The method comprises sending a request for issuing, by a second certificate authority of the communication network, a further digital certificate.

The method comprises receiving the further digital certificate having been issued by the second certificate authority.

The method may further comprise storing the received further digital certificate in response to the step of receiving the further digital certificate.

According to another exemplary aspect of the invention, a method in a network managing node for handling digital certificates in a communication network is provided. The communication network comprises a first certificate authority having issued at least one digital certificate. The method comprises sending information to a network node of the communication network for the network node requesting a further digital certificate to be issued by a second certificate authority for a revoked digital certificate.

According to another exemplary aspect of the invention, a controlling certificate authority for handling digital certificates in a communication network is provided. The controlling certificate authority comprising first and second certificate authorities. The first certificate authority has issued at least one digital certificate. The controlling certificate authority is adapted to determine whether a revocation condition for revoking the at least one first digital certificate is fulfilled. The at least one digital certificate has been issued by the first certificate authority, and the at least one digital certificate is valid and is not revoked. The controlling certificate authority is further adapted to, based on a result of the step of determining, initiate the first certificate authority to revoke the at least one digital certificate. The controlling certificate authority is adapted to, based on the result of the step of determining, initiate the second certificate authority to issue at least one further digital certificate for the revoked at least one digital certificate.

According to another exemplary aspect of the invention, a network node for handling digital certificates in a communication network is provided. The network node maintains a digital certificate having been issued by a first certificate authority of the communication network. The network node is adapted to send a request for issuing, by a second certificate authority of the communication network, a further digital certificate.

The network node is further adapted to receive the further digital certificate having been issued by the second certificate authority.

According to another exemplary aspect of the invention, a network managing node for handling digital certificates in a communication network is provided. The communication network comprises a first certificate authority having issued at least one digital certificate. The network managing node is adapted to send information to a network node of the communication network for the network node requesting a further digital certificate to be issued by a second certificate authority for a revoked digital certificate.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
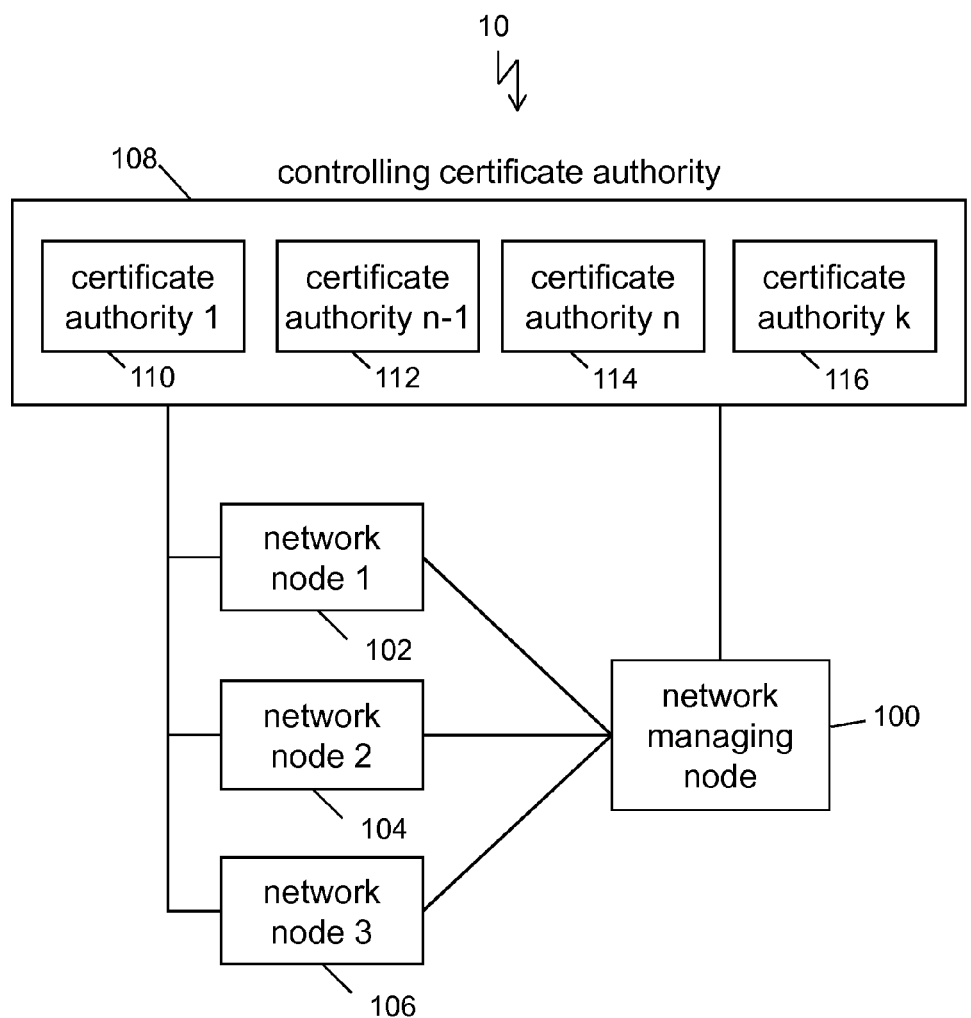
FIG. 1 is a block diagram illustrating a system for handling digital certificates according to an embodiment of the invention.

In the following, methods, network entities, and a system for handling digital certificates and associated computer programs according to the invention are described in more detail.

Within the context of the present application, the term "communication network" may particularly denote a collection of nodes, related transport links, and associated management needed for running a service, for example a telephony service or a packet transport service. Depending on the service, different node types may be utilized to realize the service. A network operator owns the communication network, and offers the implemented services to its subscribers. Typical examples of a communication network are radio access network or mobile backhaul network.

The term "digital certificate" may particularly refer to an electronic document that may bind a public key with an identity. An identity may herein be, for example, information such as a name of a person, an organization, or a network node. For example, the digital certificate can be used to verify that a public key belongs to a network node. Digital certificates are issued by a trusted Certificate Authority (CA), which is typically situated in a Network Management Systems (NMS) of the communication network. The electronic document forming a digital certificate may, for example, comprise information such as:

a serial number to uniquely identify the digital certificate;
a subject which corresponds to an entity identified.
a signature algorithm which is used to create the signature.
a signature which is the actual information used to verify that the digital certificate came from the issuer.

an issuer of the certificate, which corresponds to the entity that verified the information and issued the digital certificate;
a date from the digital certificate is first valid, with the latter date being also referred to "valid-from"; and/or
an expiration date of the digital certificate which can be also referred to as "valid-to".

A network element has typically one digital certificate. Further information on digital certificates can also be found in ITU-T X.509 standard for a public key infrastructure and a privilege management infrastructure.

The term "certificate authority (CA)" may particularly refer to a network entity issuing digital certificates. In a usual network, a CA can issue a plurality of, for example hundreds of, digital certificates. A CA may comprise either a self-signed digital certificate or it may comprise a digital certificate, which is signed by another different CA. The CA may also comprise a private key, with which the CA can issue digital certificates for network nodes and with which the CA can sign a record of invalidated and thus revoked digital certificates.

The record can be embodied as a list, for example a Certificate Revocation List (CRL), or a set or group of related data, or any other suitable data format. These digital certificates appear to be still valid from the comprised valid-to information. For example, if a network node is suspected to be compromised, then the digital certificate can be revoked. In this case the digital certificate of the node is added to the record. The network nodes are informed about the record and are therefore able to determine whether a received digital certificate is valid or not.

The term "revocation" may refer to a procedure where digital certificates are invalidated or revoked. This is done by adding the digital certificate to a CRL and sending the updated CRL to all network nodes of the communication system.

The term "controlling CA" (CCA) may particularly denote a CA which may be formed by a group of CA and which performs controlling tasks with respect to initiation of issuing and/or revocation of a digital certificate and/or requesting to add, remove, extend and/or update a trust relation from a network node to a CA. The CAs of the group of CAs may cooperatively work together to create the controlling capabilities of the controlling CA. An execution of one control command of the controlling CA may be performed by one or more CAs of the group of CAs. The CAs of the group of CAs can be configured as CAs which are independent from another such that each CA may be controlled by the controlling CA but not directly by another different CA of the group of CAs. Alternatively, the group of CAs can comprise one master CA and further CAs which are subordinate to the master CA. The master CA may control the subordinate CAs and may form the controlling instance of the controlling CA. The master CA can change over time. For example, the master CA can be set into a passive state and the controlling capabilities can be transferred to another CA which is in its active state.

The term "trust relation" may refer to a relation between two network entities which may enable one network entity to request a digital certificate from the another network entity under the knowledge that the another network node may be a trusted network entity and may issue a valid digital certificate. For example, the trust relation may be established between a network node and a CA. The network node may maintain a record of CAs in which the node has trusts. This may imply that all digital certificates and subsequent CAs of the CAs in the record that have been created, the network node trust as well. A CA that is trusted may be used to request digital certificates from. A CA in that record is trusted, and there is accordingly a trust relation of the network node to the CA. The record of the CAs can be configured as a list of CAs.

The term "trust relation addition" may refer to a procedure where a network node is instructed to add a new CA to the record of trusted CAs stored in the network node. This may for example be the case if a new CA is added to the CCA and a network shall be instructed to explicitly trust this new CA.

The term "migration" may refer to a procedure where digital certificates belonging to a first CA are revoked and new digital certificates with similar attributes as in the revoked digital certificates are issued by a second CA, by this replacing the revoked digital certificates.

The term "stopping" may refer to a procedure where a first CA stops to issue new digital certificates. The fact that no new digital certificates are to be issued may be reflected by a certain state of the CA. Even though no new digital certificates are issued anymore, the CA still may have to revoke digital certificates, for example if one of the digital certificates issued by the CA has been compromised.

Referring to FIG. 1, a system 10 for handling digital certificates according to an embodiment is shown.

The system 10 comprises a controlling certificate authority (CCA) 108 which comprises a plurality of CA 110-116. The plurality of CAs 110-116 may comprise a group of independent, root CAs 110-116 or may comprise one root CA 110-116, with which the further CAs 110-116 of the plurality of CAs are signed. The latter CAs 110-116 can be thus regarded as subordinate of the root CA.

The CCA 108 is adapted to, for example upon request, to revoke digital certificates issued by one of the CA 110-116. Such a digital certificate to be revocable is within its validity period, for example it is not expired. The CCA 108 is also adapted to issue, for example upon request, new digital certificates by using one of the CA 110-116. The CCA 108 is also adapted to, upon request, revoke one of the CA 110-116 and to create a new CA to be included into the plurality of CA 110-116.

For illustration purposes, the CA 110-116 are labeled in FIG. 1 with numbers 1 to n to indicate that the CCA 108 may comprise n CA. The denotation CA_i used in the following description refers to any CA i in the plurality of CA 1 to n. CA_i may be an embodiment of a first CA (110-116) having issued at least one digital certificate.

If the CCA 108 creates a new CA, the new CA is illustrated as CA_k. CA_k may be an embodiment of a second CA (110-116) being created by the CCA 108 based on some trigger.

A CA_i may comprise or may be selectively in two different, mutually exclusive states, in an active state or in a passive state. A CA 110-116 in its active state is adapted to issue digital certificates on request or is adapted to revoke previously issued digital certificates upon request. A CA 110-116 in its passive state is not adapted to issue digital certificates, however, the CA 110-116 is still adapted to revoke digital certificates. For example, a CA 110-116 may revoke an own digital certificate by adding the digital certificate to the own record about invalidated digital certificates.

The CCA 108, unlike the CA 110-116, is adapted to exchange signals with other network entities, such as a network managing node 100 of the system 10 and to receive requests from a network node 102-106 of the system 10.

In the illustrated embodiment, the CCA 108 comprises the CA 110-116. However, in another embodiment, the CA 110-116 may be network entities which are separated from the CCA 108 and are connected with the CCA 108 via appropriate signaling. In a yet further embodiment, one or more of the CA 110-116 are embodied as a separate network entity with respect to the CCA 108 and one or more CA 110-116 are part of the CCA 108.

The network managing node 100 is adapted to handle digital certificates and to manage trust relations in the network nodes 102-106. To this end, the network managing node 100 may comprise an interface to the CCA 108. The network managing node 100 may furthermore have knowledge about network nodes 102-106 in the communication network and may have management interfaces to the network nodes 102-106. These management interfaces may be accomplished by a separate operation and maintenance connection, or may be also realized by a separate logical connection combined with other user traffic related logical connections on the same physical link. Logical connections may be established via, for example, by Ethernet Local Area Network, E-LAN, or label switching technologies such as Multi-Path Label Switching, MPLS, or IP-tunneling mechanisms.

The CCA 108 and the network managing node 100 may be stand-alone network entities, or both may be part of a Network Management System (NMS). Such a NMS may be adapted to act upon an external request. For example, the NMS may receive an external request to create a new digital certificate or to revoke a valid digital certificate. Alternatively, the NMS may receive an external request to revoke a CA 110-116. Alternatively or additionally, the NMS may be adapted to act upon internally generated requests, i.e. requests which may be generated internally within the NMS system. Such internal request may be then processed by the CCA 108.

The network nodes 102-106 may typically be those network entities handling user traffic or signaling traffic associated with user traffic in the communication network. In a radio access network, the network nodes 102-106 may be, for example, pico-, nano-base stations and/or associated supporting IP connectivity nodes. In a mobile backhaul network, the network nodes 102-116 may be packet aggregation transport nodes and/or nodes related with microwave transport link technologies. The network nodes 102-106 may be embodied of any type of node of a communication network which node is deployed in larger quantities or in a wider geographical area.

The network node 102-106 may have an interface to the CCA 108 for requesting a digital certificate. After having received a digital certificate, the digital certificate can be stored locally in the respective requesting network node 102-106. The network node 102-106 may also maintain a record defining a group of CA 110-116 to which a trust relation exists, in order to be enabled to know which CA 110-116 is to be trusted. Such a record can be embodied as a list. Here, a CA 110-116 to which a trust relation exists is a trusted CA 110-116. The network node 102-106 can be adapted to request a digital certificate from a trusted CA 110-116. The network nodes 102-106 may also have an interface to the network managing node 100. The network nodes 102-106 may be also adapted to change the record of the trusted CA 110-116, for example, by adding a CA 110-116 to the record or remove CA 110-116 from that record. To this end, the network managing node 100 can request a change of the record of trusted CA 110-116.

For illustration purposes, the network nodes 102-106 are labeled with numbers 1 to 3 to indicate that there are three network nodes in this example embodiment. A network node j refers to any of network nodes 102-106.

Figure 2:
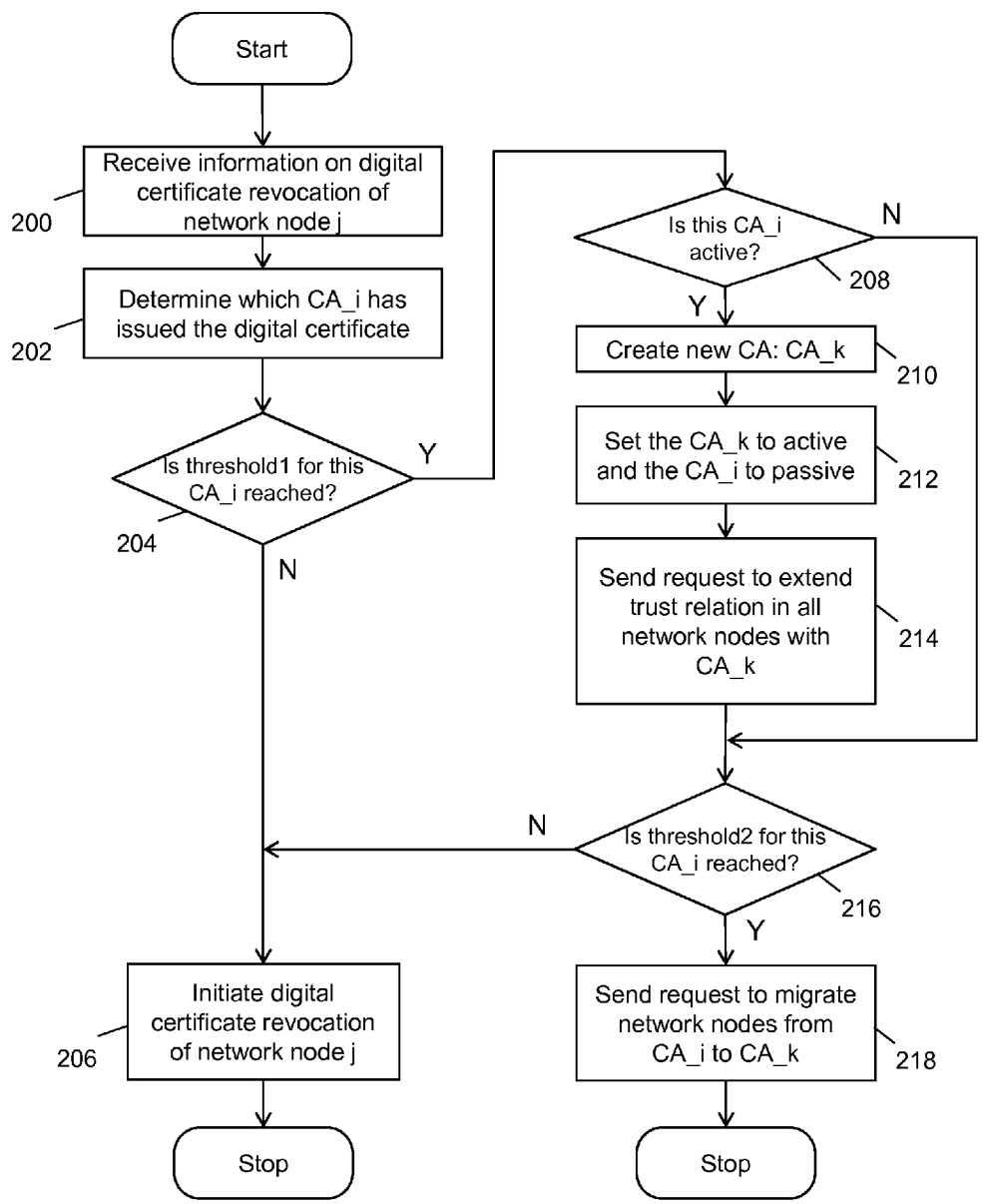
FIG. 2 is a flow diagram illustrating a method in a controlling certificate authority for handling digital certificates according to an embodiment of the invention.

Referring to FIG. 2, a method in the CCA 108 for handling digital certificates will be explained.

A request for revocation of a digital certificate of a network node 102-106, here denoted as the network node j, is received by the CCA 108 in a step 200. If the CCA 108 is part of a NMS, this request may originate from external of the NMS or may also be triggered by an NMS internal event. The external request may, for example, be generated in response to a network node 102-106 got compromised. The request received in the step 200 comprises information indicating the identity of the requesting network node j and/or the issued digital certificate. The information indicating the issued digital certificate can be the certificate itself or the serial number of the digital certificate. The information of the request may also indicate the respective CA 110-116 having issued the digital certificate in question.

In a next step 202, the CCA 108 determines the CA 110-116, which has issued the digital certificate. This can be accomplished, for example, by analyzing the received information and identifying the respective CA 110-116. For example, in the case of the request comprising the digital certificate, information about the issuer of the digital certificate is already included in the digital certificate. The CCA 108 may also keep track on by which CA 110-116 a network node 102-106 was certified. The CCA 108 can therefore identify the respective CA 110-116 by using the information included in the request about the requesting node j The determination results in one of the CAs 110-116 and is denoted CA_i.

In a next step 204, the CCA 108 determines whether a trust relation addition condition for adding a trust relating in network node j to the CA_k is fulfilled. This step 204 is accomplished by a threshold comparison. However, this step can be also accomplished by two or more successively performed threshold comparisons with respective determination rules and a respective rule how to combine the results of the threshold comparisons. Alternatively, the step 204 may relate to one or more successively performed yes/no determinations in which the fulfillment of the condition is tested.

As illustrated in FIG. 2, it is determined whether a first threshold is reached for this CA_i by comparing a characteristic with the first threshold. The first threshold is labeled in the FIGS. 2 and 3 by threshold1. The characteristic and the first threshold are quantified using the same measure or metric such that the characteristic can be regarded as characteristic corresponding to the first threshold. If the characteristic is below the first threshold, the first threshold is not reached for this CA_i, and the method proceeds with a step 206. If the corresponding characteristic is equal to or above the first threshold, the threshold is reached for this CA_i and the method proceeds with the step 208.

In the step 206, the revocation of the digital certificate is initiated or triggered by the CA_i. To this end, the CCA 108 informs the CA_i to revoke the digital certificate. The digital certificate is added to the record of invalidated digital certificate of the CA_i and the updated record can be downloaded to all network nodes 102-106. The record can be embodied as a list, for example a CRL.

In the step 208, the CCA 108 determines whether the CA_i is in its active state. As described above, a CA 110-116 in the active state is enabled to issue new digital certificates upon request or revoke previously issued digital certificates upon request. A CA 110-116 in its passive state does not issue any new digital certificates, however, the CA 110-116 is still able to revoke digital certificates. If the determination results in the CA_i being in the active state, the method proceeds with steps 210-214 and thereon with a step 216. If the determination results in the CA_i being in the passive state, the method continues with the step 216.

If the CA_i is in its active state, the CCA 108 creates in the step 210 a new CA 110-116, here denoted by CA_k. In the next step 212, the CA_k is set to its active state and the CA_i to its passive state such that stopping, by the CA_i, to issue a new digital certificate and enabling the CA_k, to issue the new digital certificate are performed simultaneously. Alternatively, the state changes in CA_i and CA_k may be initiated in parallel, or the CA_k may be set to its active first and later the CA_i may be set to passive state or vice versa.

In the step 214, the CCA 108 sends information to the network managing node 100 to extend the trust relation in all network nodes 102-106 having a trust relation with the CCA 108 with CA_k.

In the next step 216, the CCA 108 determines whether a revocation condition for revoking the digital certificate of the node j is fulfilled. Here the particular digital certificate has been issued by the CA_i and the at least one digital certificate being valid and being not revoked. However, this step 216 can be also accomplished by two or more successively performed threshold comparisons with respective determination rules and a respective rule how to combine the results of the threshold comparisons. Alternatively, the step 216 may relate to one or more successively performed yes/no determinations in which the fulfillment of the above condition is tested.

Figure 3:
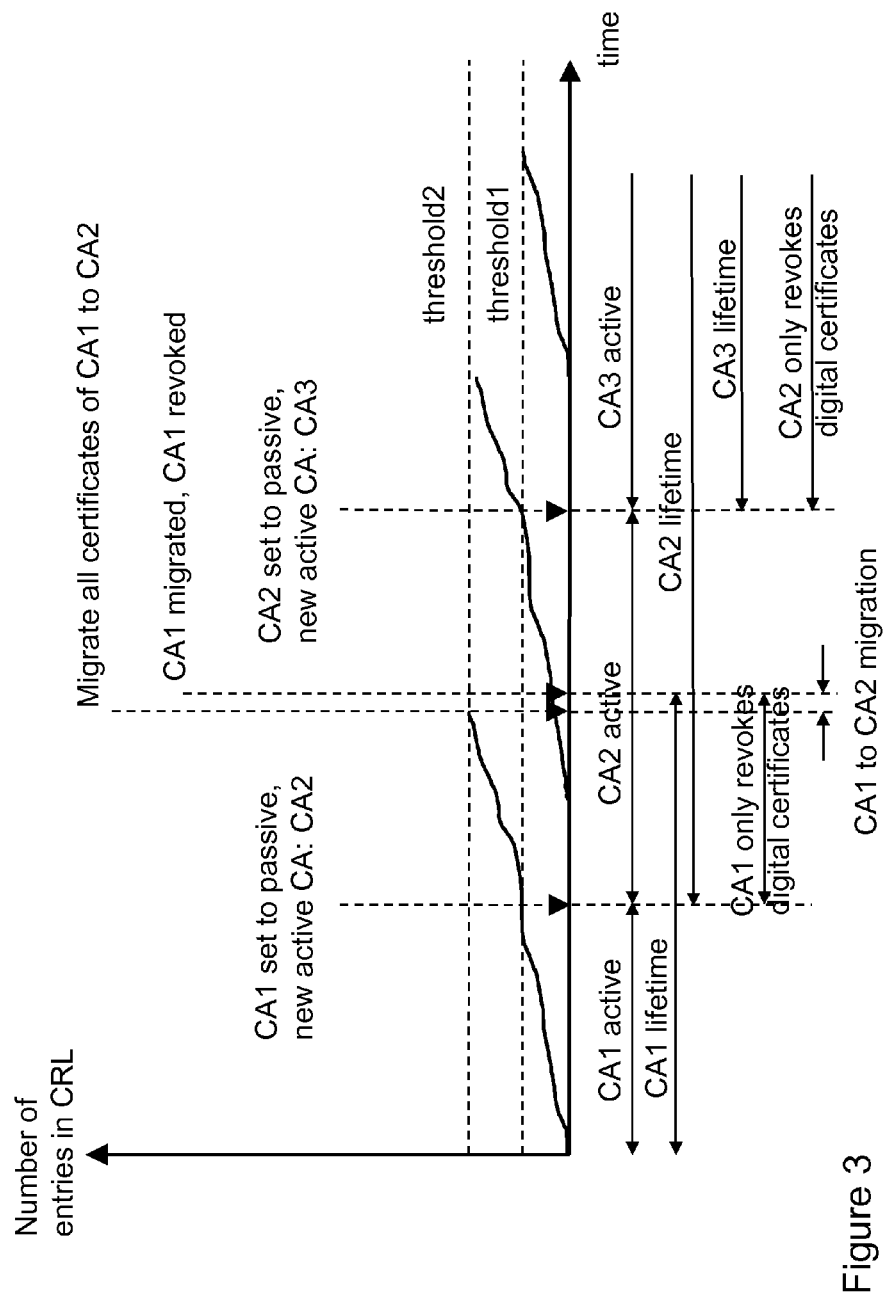
FIG. 3 is a diagram illustrating a number of network nodes of the system in FIG. 1 and an activity state of certificates authorities of the system in FIG. 1 depending on a time.

In the step 216, the CCA 108 determines whether a second threshold labeled in FIGS. 2 and 3 by threshold2 is reached for this CA_i by comparing a corresponding characteristic with the second threshold. As described for the first threshold, if the corresponding characteristic is equal to or above the second threshold, the threshold is reached for this CA_i, and else the second threshold is not reached. A metric in which the corresponding characteristic and the second threshold are measured could be, for example, the same as described for the first threshold. The metric in which the corresponding characteristic and the second threshold are measured can be also different from the respective one used for the step 204.

If the determination in the step 216 results in the threshold2 being not reached for this CA_i, the step 206 is executed and the revocation of the digital certificate is initiated. If the determination in the step 216 results in the threshold2 being reached for this CA_i, the CCA 108 sends in a successive step 216 a request to the network managing node 100 to migrate the digital certificates from the CA_i to the CA_k. This step 218 is shown in in more detail in FIG. 4 from the perspective of the network management node 100. The method then stops.

In the following, embodiments of the metrics used for the first threshold and the corresponding characteristic and for the second threshold and the corresponding characteristic will be explained.

In a first option, the respective threshold and the corresponding characteristic can be a length of the record about the invalidated digital certificates in the CA_i for those digital certificates having been revoked. Here, the record can be the CRL. If a length of a record reaches a specific, predetermined size, the first threshold is reached.

In a second option, the respective threshold and the corresponding characteristic can be a number of entries in the record of invalidated digital certificates, particularly the CRL, in the CA_i. If a number of entries in the record reach a specific, predetermined number, the threshold is reached.

In a third option, the threshold and the corresponding characteristic can be measured in units of an elapsed life time of the CA_i since a creation of the CA_i. If a time since a CA 110-116 has been created reaches a specific, predetermined time duration, the threshold is reached. Using a time dimension as measure for the characteristic and the, particularly first, threshold directly indicate that a CA 110-116 should be deprecated.

In a fourth option, the respective threshold and the corresponding characteristic can be a remaining life time of the CA_i. If a lifetime of a CA 110-116 has been defined, and the time until the end of this lifetime is reached, reaches specific, predetermined time duration. The first threshold in a time dimension can indicate that the CA 110-116 will expire soon, and thus it may be useful not to start any management action by the CCA 108.

In a fifth option, the respective threshold and the corresponding characteristic can be a ratio between digital certificates revoked by the CA_i and digital certificates issued by the CA_i. If a CA 110-116 reaches a certain ratio of the revoked and issued digital certificates, and therefore the number of revoked network nodes has increased in proportion of the issued network nodes, then the CA 110-116 may need to be set to passive state in the step 212 or the digital certificates to be migrated in the step 216.

For example, if 10% of the network nodes 102-106 are revoked, then the CA 110-116 are to be set into the passive state.

In a sixth option, the respective threshold and the corresponding characteristic can be a number of remaining valid digital certificates, the digital certificates not being revoked and not being expired. If a number of valid digital certificates reach a specific, predetermined number, the threshold is reached.

Assuming the steps 204 and/or 216 to be based on the yes/no determination, the respective condition can relate, in a first option, to the CA_i being compromised, or, in a second option, an administrative reason affecting the CA_i. The latter can be particularly a change of a name of the CA_i, a shutdown of the CA_i, a change of a platform of the CA_i, or maintenance work to be performed for the CA_i.

If one of the determinations of the steps 204 and 216 are based on multiple successive determinations, the characteristic and the first threshold and the characteristic and the second or more thresholds can be a combination of two or more of the above explained embodiments.

In a first example, the number of entries in the record of invalidated digital certificates and the elapsed time since the creation of the CA 110-116 are used in the step 216. A respective combined determination rule defines that if the length of the record of invalidated digital certificates, particularly the CRL, reaches a respective preconfigured value in and if the time since the CA 110-116 is created has not or has reached a respective preconfigured value, then the determination results in the threshold being reached. Such a combined usage of two metrics, namely the length of the record and the time, enable that the, particularly first, threshold in the time dimension can indicate that a rather intensive revocation was performed not far subsequent to the creation of the CA 110-116. The latter network behavior could be caused by the CA 110-116 having security problems in a beginning, for example, an digital certificate issue process of the CA 110-116 has been faulty or unsecure, while the revocation of the digital certificates by the CA 110-116 continued at a same intensity.

In a second example, the number of entries in the record of invalidated digital certificates and the remaining time of the CA 110-116 are used in the step 204. If the length of the record of invalidated digital certificates reaches a specific value and, in addition, the remaining lifetime of the CA 110-116 has or has not reached another preconfigured value, then the overall threshold used in the step 204 is reached. The motivation here is to put the threshold on the length of the record of invalidated digital certificates and time. The threshold in time dimension can indicate that the CA 110-116 will expire soon, thus it may be useful not to start any management action.

Referring to FIG. 3, a network evolution in terms of a number of network nodes of the system in FIG. 1 and an activity state of the CA 110-116 of the system in FIG. 1 with respect to time will be explained. For ease of description, it is assumed that the steps 204 and 216 are based on respective thresholds measured in a number of entries in a CRL of the CA 110-116. However, different kinds of determinations and/or different metrics as described with respect to FIG. 2 are conceivable.

In a worst case, a CRL can comprise nearly all non-expired digital certificates that had been issued by the corresponding CA 110-116. If the number of digital certificates issued by a CA 110-116 is large, then the CRL can be extremely long and the verification of the CRL can be resource consuming. As depicted in FIG. 3, this situation can happen in time if the digital certificate lifetime of the CA 110-116 is long. This situation is especially valid for radio networks of new generations, which comprise pico- and nano-base stations as well network equipment with limited processing capability.

To address such a situation, a first threshold and a second threshold are introduced. If the first threshold associated with the first determination in the step 204 and denoted threshold) is reached on a CRL belonging to a CA 110-116, then the CA 110-116 is set to a passive state, which means that the CA 110-116 is disallowed to issue any new digital certificate. In parallel, a new CA 110-116 is created and set into its active state to handle new incoming requests for digital certificates.

If the second threshold associated with the first determination in the step 204 and being denoted threshold2 is reached on a CRL belonging to a CA 110-116, then the valid, i.e. the not expired and not revoked, digital certificates of this CA 110-116 are migrated under the active CA 110-116. The migration is performed in such a way that the digital certificates belonging to the CA 110-116, for which the CRL had reached the second threshold, are revoked and new digital certificates with similar attributes as in the revoked digital certificates are issued under the new active CA 110-116 in order to replace the revoked digital certificates.

As the purpose of a NMS is to manage and control the managed nodes 102-106, the above operations on CA 110-116 are not sufficient, as the changes need to be propagated to the network nodes 102-106 by the network managing node 100. The digital certificate handling and trust management on the network is required to be transient and seamless to the communication network operator, who manages the network, as well as for the users of the communication network.

Therefore, if a digital certificate of a network node 102-106 is migrated, the new digital certificate issued by the active CA 110-116 needs to be propagated to the network node 102-106, for which the digital certificate has been created. Likewise, the migration includes the update of a trust relation on the relevant network node 102-106.

The migration procedure is considered as a short transient phase. The network NMS performs automated and seamlessly the migration steps, without communication network operator interaction and without any impacts on the users of the communication network.

With reference to FIG. 3, a number of entries in a CRL over time is depicted, when applying the method of FIG. 2, and the case that first threshold and second threshold are tied to the number of entries in the CRL. An abscissa of the diagram in FIG. 3 corresponds to a time, and an ordinate of the diagram corresponds to the number of entries in the CRL. As a starting point of the diagram, a CA1 is active and is issuing new digital certificates. As time progresses, digital certificates have to be revoked and are put into the CRL. This causes a growing number of entries in the CRL.

At some point of time indicated by a vertical dashed line, the number of entries in the CRL reaches the first threshold marked by a horizontal dashed line. At this point of time, a new CA 110-116 called CA2 is created, and CA1 is set to its passive state. From this time onwards, the CA1 will not issue any new digital certificates. However, new digital certificates will from then on be issued by the CA2.

As time progresses further, the number of entries in the CRL still grows, as more and more digital certificates issued by the CA1 are revoked. This continues until the second threshold also marked by horizontal dashed line is reached. A corresponding point in time is indicated by a further vertical dashed line. Meanwhile also the CA2 had to revoke some of its issued digital certificates, causing a growing CRL of CA2.

When the second threshold is reached, the migration of valid and not revoked digital certificates of CA1 to CA2 starts. After all digital certificates have been replaced, CA1 is revoked and thus the lifetime of CA1 ends. An associated point in time is also marked by a dashed vertical line.

This process continues in the same way, now waiting until the first threshold is reached for the number of entries in the CRL of CA2. When this happens, CA2 is set to passive state and a new CA 110-116 called CA3 is created. New digital certificates are now issued by CA3, and CA2 will still continue revoking own digital certificates.

As can be derived from the diagram in FIG. 3, the length of the CRL is limited to a length defined by second threshold. It is noted that the value of the first threshold and the second threshold, respectively, of the CRL of the CA1, CA2 and CA3 can be identical or different from one another.

Figure 4:
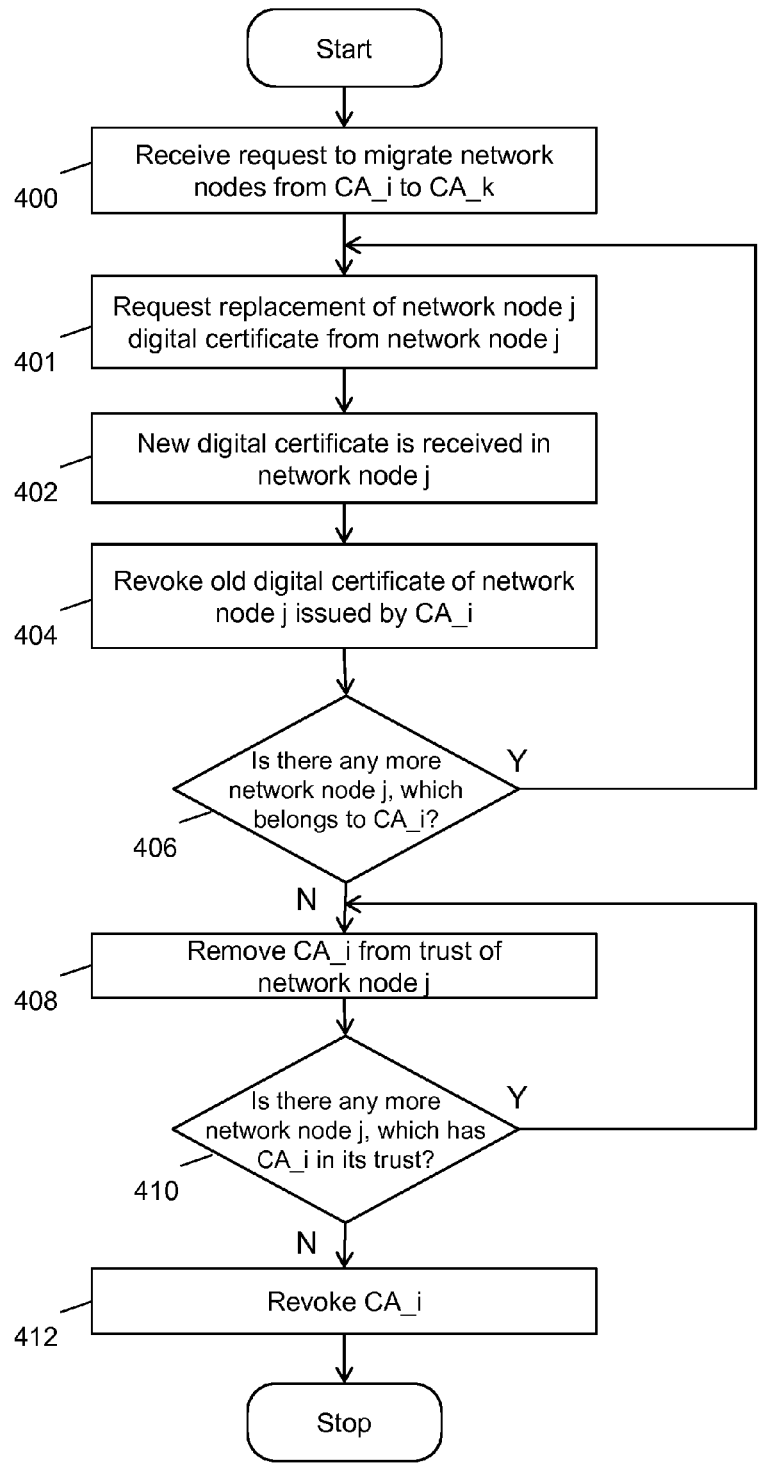
FIG. 4 is a flow diagram illustrating a method in a network managing node for handling digital certificates according to an embodiment of the invention.

Referring to FIG. 4, a method in the network managing node 100 for handling digital certificates according to an embodiment will be explained. FIG. 4 shows the process of migrating the network nodes 102-106 from the CA_i to the CA_k, as initiated by step 216 in FIG. 2. This is triggered when the second threshold is reached. To this end, the CCA 108 sends a corresponding request to the network managing node 100.

After having received a request for migrating the network nodes 102-106 from the CA_i to the CA_k in a step 400, the network managing node 100 sends in step 401 a request to a network node j for replacement of a network node j digital certificate. The process of the network node j is detailed in FIG. 6.

In a next step 402, a new digital certificate is received in network node j, issued by the CA_k.

Then, in a step 404, the network managing node 100 triggers the revocation of the old digital certificate of network node j, issued by the CA_i, by sending a corresponding request to the CCA 108.

The steps 400, 402, and 404 are repeated for all network nodes j, which have a digital certificate issued by the CA_i. This loop can be run in sequential order for all network nodes j, or in parallel. A step 406 corresponds to a corresponding loop end check or loop end determination.

Once all digital certificates issued by the CA_i have been replaced in the network nodes 102-106 and have also been revoked, the process continues with a step 408. In the step 408, the network managing node 100 instructs or requests a network node j to remove CA_i from its list of trusted CA 110-116. This instruction, or request, may be accomplished using mechanisms provided by an operation and maintenance. So node interfaces and network connections dedicated for operation and maintenance may be used to deliver this request or instruction.

The step 408 is repeated for all network nodes j, which have the CA_i in the list of trusted CA 110-116. This loop can be run in sequential order for all network nodes j, or in parallel. A step 410 corresponds the corresponding loop end check or loop end determination.

Once CA_i has been removed from the list of trusted CA 110-116 in all network nodes 102-106, a step 412 is performed. In this step 412, the network managing node 100 instructs the CCA 108 to revoke the CA_i. In this embodiment the revocation of the CA_i is performed as a last step of the flow diagram. Alternatively, the revocation of the CA_i may be performed before on in parallel to the step 408 of instructing a network node j to remove CA_i from its list of trusted CA 110-116.

Then the method stops.

Figure 5:
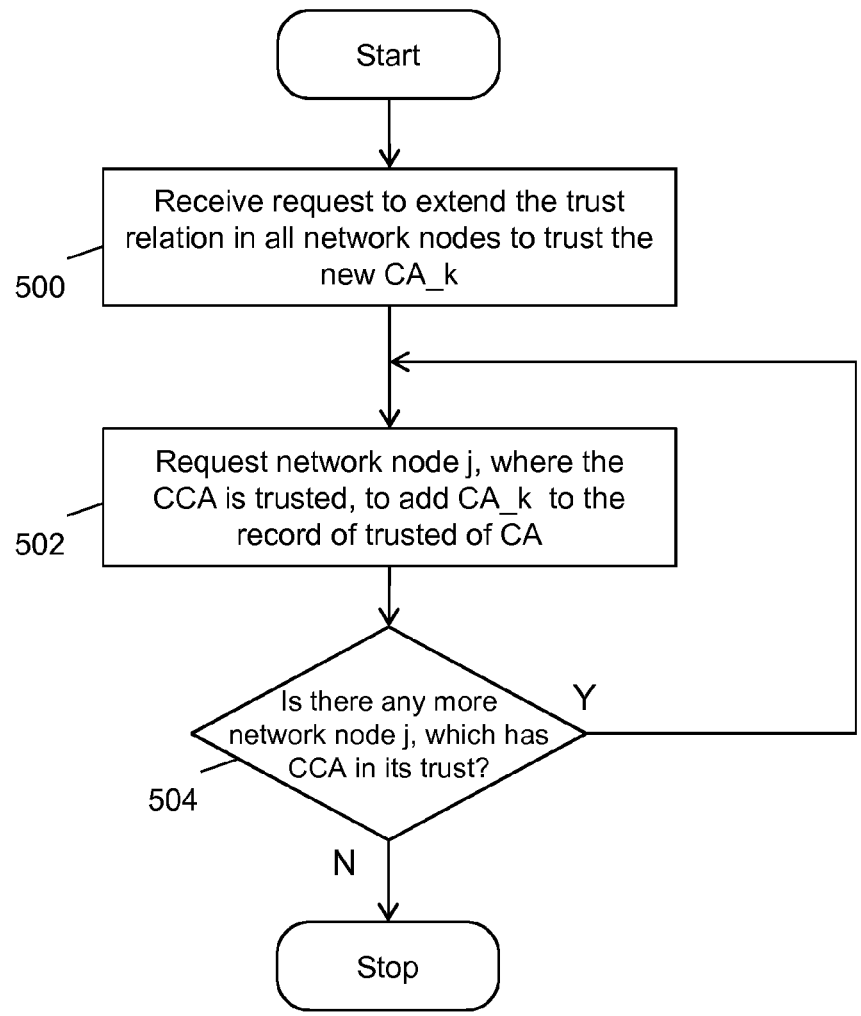
FIG. 5 is a flow diagram illustrating a method in a network managing node for handling digital certificates according to an embodiment of the invention.

Referring to FIG. 5, a method in the network managing node 100 for handling digital certificates according to an embodiment is explained.

The network managing node 100 receives in a step 500 a request to extend a trust relation in all network nodes 102-106 to trust the new CA_k. This step corresponds to the step 214 in FIG. 2.

Responsive to this request, in a step 502, the network managing node 100 sends a request, to the network node j in which the CCA 108 is trusted, to extend the trust relation to trust the new CA_k. This instruction, or request, may be performed using mechanisms provided by an operation and maintenance. So node interfaces and network connections dedicated for operation and maintenance may be used to deliver this request or instruction.

The step 502 is repeated for all network nodes j, which trust the CCA 108. This loop can be run in sequential order for all network nodes j, or in parallel. Step 504 performs the corresponding loop end check or loop end determination.

Then the method stops.

Figure 6:
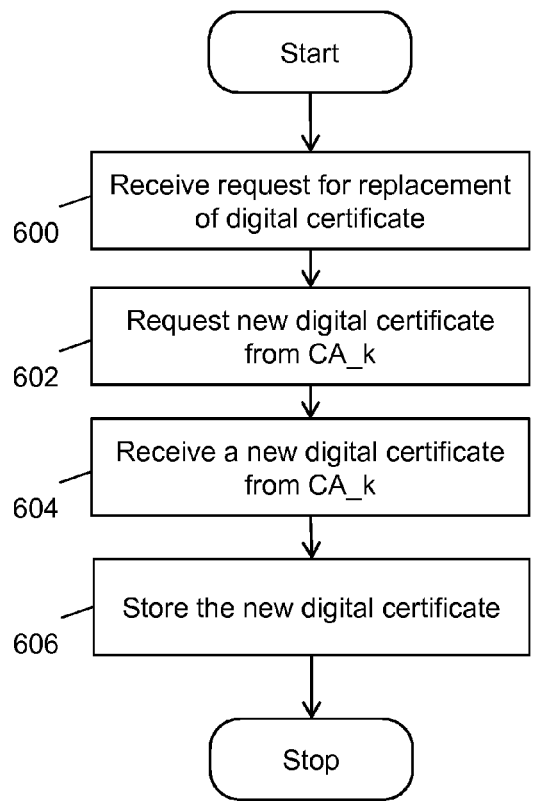
FIG. 6 is a flow diagram illustrating a method in a network node for handling digital certificates according to an embodiment of the invention.

Referring to FIG. 6, a method in the network node 102-106 for handling digital certificates will be explained.

The network node 102-106 receives in a step 600 a request for replacement of its digital certificate. This step 600 corresponds to the step 400 in FIG. 4.

Responsive to this request the network node 102-106 requests in a step 602 a new digital certificate from the trusted CA_k.

In a next step 604, the new digital certificate is received from the trusted CA_k.

The new digital certificate is stored in the network node 102-106, replacing the old digital certificate.

Then the method stops.

Figure 7:
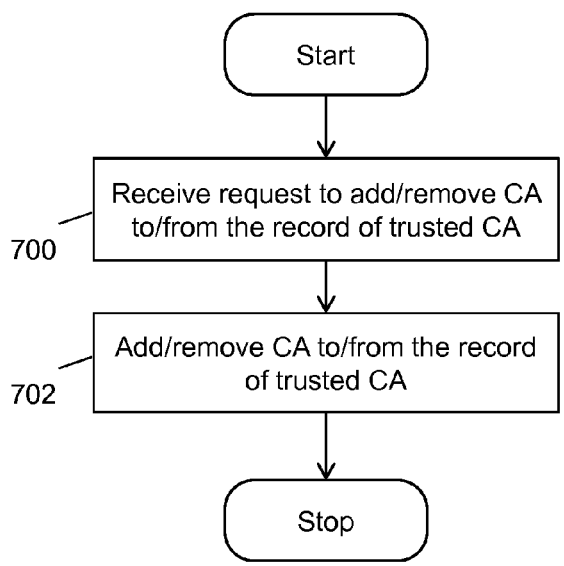
FIG. 7 is a flow diagram illustrating a method in a network node for handling digital certificates according to an embodiment of the invention.

Referring to FIG. 7, a method in the network node 102-106 for handling digital certificates according to an embodiment will be explained.

The network node 102-106 receives in a step 700 a request to add or to remove a given CA 110-116 to or from a list of trusted CA 110-116, respectively. This step 700 corresponds to the step 502 in FIG. 5, and to the step 408 in FIG. 4.

Responsive to this request the network node 102-106 adds or removes in a step 702 a given CA 110-116 to or from the record of trusted CA 110-116, respectively.

Then the method stops.

Figure 8:
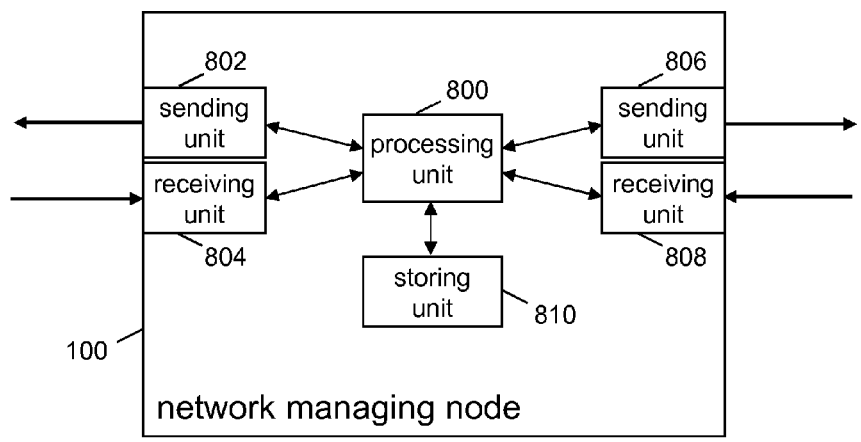
FIG. 8 is a block diagram illustrating a network managing node for handling digital certificates according to an embodiment the invention.

Referring to FIG. 8, a network managing node for handling digital certificates will be described. The illustrated network managing node may correspond to the network managing node 100 illustrated in FIG. 1. The network managing node 100 may be adapted to perform one or more steps of the above described method shown in FIG. 4 or FIG. 5.

The network managing node 100 may comprise a number of functional units, which are described in further detail below and which are adapted to perform respective method steps.

A processing unit 800 of the network managing node 100 may be adapted to process a request from a CCA 108 to extend a trust relation in all network nodes 102-106 in order to trust a new CA 110-116, for example the CA_k. The processing unit 800 may further be adapted to process the removal of a trust relation in all network nodes 102-106 to an old CA 110-116, CA_i. The processing unit 800 may further be adapted to request the network nodes 102-106 to replace a digital certificate. The processing unit 800 may further be adapted to instruct the CCA 108 to revoke an old CA 110-116, CA_i. The processing unit 800 may further be adapted to generate and handle corresponding responses to the CCA 108 and the network nodes 102-106 of the communication network. In one embodiment, the processing unit 800 may be one processor taking care of all the above functions, or in another embodiment the latter described functions may be distributed over more than one processor, wherein the functions are accordingly distributed over the available processors of the network managing node 100.

The network managing node 100 may further comprise a sending unit 802 and a receiving unit 804 via which the network managing node 100 can communicate with a CCA 108. The network managing node 100 may also comprise a sending unit 806 and a receiving unit 808 via which the network managing node 100 can communicate with other network nodes 102-106 of the communication network. The sending unit 802, 806 and the receiving unit 804, 808 may be part of a respective interface, respectively. Alternatively, the network managing node 100 may comprise a single send and receive interface. This interface could then be used for both the communication with the CCA 108 and with the network nodes 102-106 of the communication network.

The network managing node 100 may also comprise a storing unit 810 for storing information related to the handling of digital certificates and to the management of trust relations as described above. The storing unit 810 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 810 may be used to store information about the network nodes 102-106 of the communication network, for example which CA 110-116 has issued the digital certificate of network node 102-106.

Figure 9:
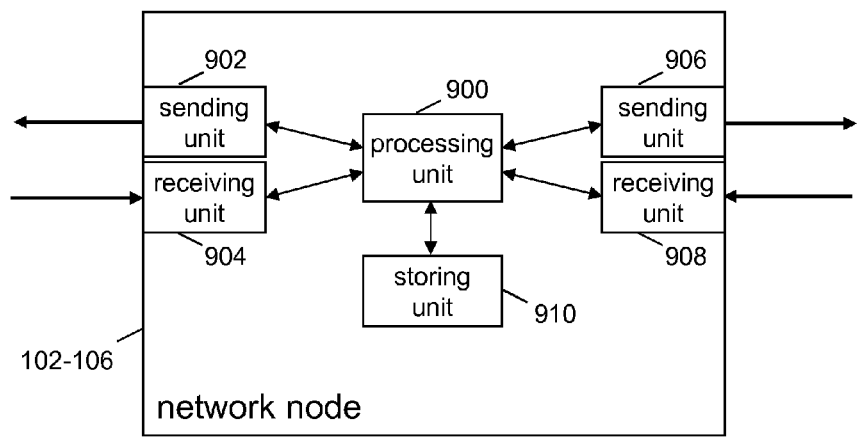
FIG. 9 is a block diagram illustrating a network node for handling digital certificates according to an embodiment the invention.

Referring to FIG. 9, a network node for handling digital certificates according to an embodiment will be described. The network node may be one of the network nodes 102-106 of FIG. 1. The network node 102-106 may be adapted to perform one or more steps of the above described method shown in FIG. 6 or FIG. 7. The network node 102-106 may comprise a number of functional units, which are described in further detail below and which are adapted to perform respective method steps.

A processing unit 900 of the network node 102 may be adapted to process a request for replacement of digital certificate. The processing unit 900 may further be adapted to process a request for addition or removal of a trust relation to/from a CA 110-116. The processing unit 900 may further be adapted to request a new digital certificate from a CA 110-116, replacing an existing digital certificate. The processing unit 900 may further be adapted to generate and handle corresponding responses to the CCA 108 and the network managing node 100. In one embodiment, the processing unit 900 may be one processor taking care of all the above functions, or in another embodiment the functions may also be distributed over more than one processor, wherein the functions are distributed over the available processors of the network node 102-106.

The network node 102-106 may further comprise a sending unit 902 and a receiving unit 904 via which the network node 102-106 can communicate with a CCA 108. The network node 102-106 can also comprise a sending unit 906 and a receiving unit 908 via which the network node 102-106 can communicate with network managing node 100. The sending unit 902, 906 and the receiving unit 904, 908 may be part of a respective interface, respectively. Alternatively, the network node 102-106 may also comprise a single send and receive interface. This interface could then be used for both the communication with the CCA 108 100 and with the network managing node 100.

The network node 102-106 may also comprise a storing unit 910 for storing information related to the handling of digital certificates and to the management of trust relations as described above. The storing unit 910 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 910 may be used to store information, for example about the CCA 108, the own digital certificate, or a record of trusted CA 110-116.

The network node 102-106 may also comprise functional units related to the primary function of the node. For example, in a case in which the network node 102-106 is embodied as a base station, the network node 102-106 would typically comprise functional entities related to radio transmission and packet transport. Such functional units are omitted in the figure for clarity reasons.

Figure 10:
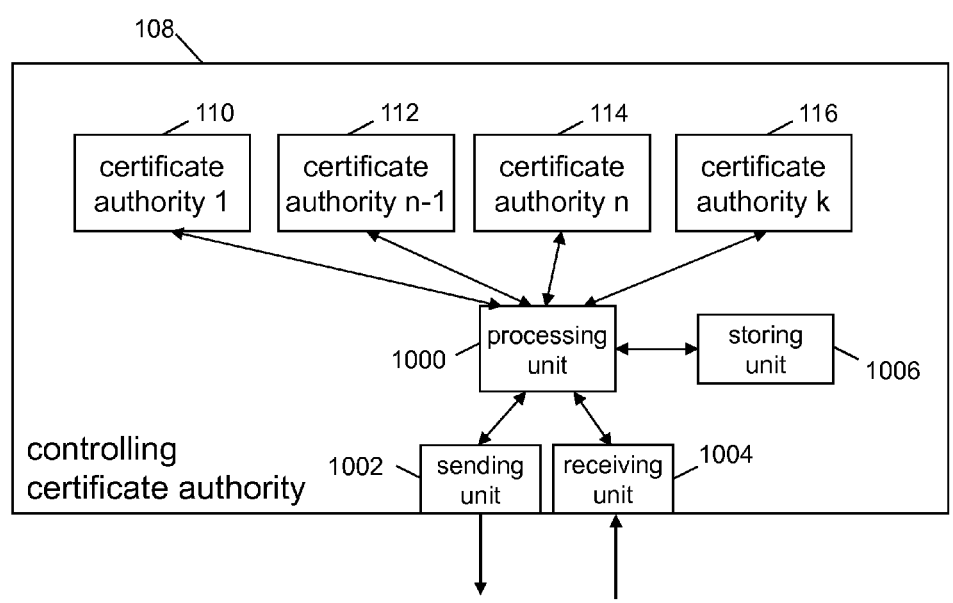
FIG. 10 is a block diagram illustrating a controlling certificate authority for handling digital certificates according to an embodiment the invention.

Referring to FIG. 10, a CCA for handling digital certificates according to an embodiment will be described. The CCA may be embodied as the CCA 108 described above.

The CCA 108 may be adapted to perform one or more steps of the above described method shown in FIG. 2. The CCA 108 may comprise a number of functional units, which are described in further detail below and which are adapted to perform respective method steps.

A processing unit 1000 of the CCA 108 may be adapted to process a request to a network managing node 100 to extend a trust relation in all network nodes 102-106 to trust a new CA 110-116, CA_k. The processing unit 1000 may further be adapted to process a request to the network managing node 100 to migrate network nodes 102-106 from CA_i to CA_k. The processing unit 1000 may further be adapted to process a request from a network node 102-106 to provide a new digital certificate. The processing unit 1000 may further be adapted to process information on a digital certificate revocation of a network node 102-106, and to trigger the extension of a record of invalidated digital certificates with a digital certificate to be revoked. The processing unit 1000 may further be adapted to identify a CA 110-116 having issued a given digital certificate. The processing unit 1000 may further be adapted to process setting of a state of a CA 110-116 to either active or passive. The processing unit 1000 may further be adapted to process the creation of a new CA 110-116, for example CA_k. The processing unit 1000 may further be adapted to process the determination whether a threshold is reached, the threshold being either the first threshold or the second threshold. The processing unit 1000 may further be adapted to generate and handle corresponding responses to the network managing node 100 and the network nodes 102-106 of the communication network. In one embodiment, the processing unit 1000 may be one processor taking care of all the above functions, or in another embodiment the functions may also be distributed over more than one processor, wherein the functions are distributed over the available processors of the CCA 108.

The CCA 108 may further comprise a sending unit 1002 and a receiving unit 1004 via which the CCA 108 can communicate with a network node 102-106 and a network managing node 100. Alternatively, the CCA 108 may comprise a second send and receive interface and therefore may comprise separate send and receive interfaces for the CCA 108 and the network managing node 100 interfaces.

The CCA 108 may also comprise a storing unit 1006 for storing information related to the handling of digital certificates and to the management of trust relations. The storing unit 1006 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 1006 may be used to store information, for example a CRL per CA 110-116.

According to another embodiment, a computer program is provided. The computer program can be executed by the processing units 800, 900 and/or 1000 of the above mentioned network entities 100, 102-106 and 108 such that a method for handling digital certificates as described above with reference to FIGS. 1 to 9 can be carried out or be controlled. In particular, the network entities 100, 102-106 and 108 can be caused to operate in accordance with the above described method by executing the computer program.

The computer program can be embodied as computer code, for example of a computer program product. The computer program product can be stored on a computer readable medium, for example a disk or the storing unit 810, 910, 1006 of the network entities 100, 102-106 and 108, or can be configured as downloadable information.

One or more embodiments as described above may enable at least one of the following technical effects:

Network nodes such as the network nodes 102-106 with limited resources might not need to hold and process long records of invalidated digital certificates, while the digital certificates of these nodes 102-106 may be always valid and the security of the overall system may be overall kept intact.

The usage of two determination steps 204, 216 may allow the system 10 to perform a smooth replacement of a CA 110-116 by a new CA 110-116 which will become available to serve for issuing new digital certificates.

The described methods may be automatically performed, and no operator involvement for maintenance might be needed. The latter may be able to handle the security in a network comprising a large number of network nodes 102-106 or a highly fluctuating network.

The embodiment works in fluctuating network, where the network nodes 102-106 are often replaced, removed, compromised or new ones are installed. The embodiment also works in mobile radio network where the nano, pico base stations of Global System for Mobile communications, GSM, Third Generation, 3G, Long Term Evolution, LTE, systems are often replaced, reconfigured, compromised or new such base stations are installed.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for handling digital certificates in a communication network, the communication network comprising a first certificate authority having issued at least one digital certificate, the method comprising:
   determining whether a revocation condition for revoking the at least one digital certificate is fulfilled, wherein:
      the at least one digital certificate was issued by the first certificate authority;
      the at least one digital certificate is valid and not presently revoked; and
      any given digital certificate that is not revoked is uniquely identified by a unique identifier;
   based on a result of the determining:
      revoking, by the first certificate authority, the at least one digital certificate; and
      issuing, by a second certificate authority, at least one further digital certificate to have a same unique identifier as one of the at least one digital certificate that is revoked.

2. The method of claim 1, further comprising:
   prior to the determining, determining whether a trust relation addition condition for adding a trust relation in at least one network node of the communication network to the second certificate authority is fulfilled; and
   based on a result of determining whether the trust relation addition condition is fulfilled, establishing a trust relation in the at least one network node of the communication network to the second certificate authority.

3. The method of claim 2, wherein the establishing comprises sending, to a network managing node, information for the network managing node to send information to the at least one network node to add a trust relation in the at least one network node to the second certificate authority.

4. The method of claim 2, further comprising stopping, based on the result of the determining whether the trust relation addition condition is fulfilled, by the first certificate authority, to issue a further digital certificate and enabling the second certificate authority to issue the at least one further digital certificate.

5. The method of claim 2, further comprising, based on the result of the step of determining whether the trust relation addition condition is fulfilled, creating the second certificate authority.

6. The method of claim 4, wherein the following are performed in parallel:
   the stopping, by the first certificate authority, to issue a further digital certificate; and
   the enabling the second certificate authority, to issue the at least one further digital certificate.

7. The method of claim 2, further comprising:
   stopping, based on the result of the determining whether the trust relation addition condition is fulfilled, by the first certificate authority, to issue a further digital certificate and enabling the second certificate authority to issue the at least one further digital certificate; and
   subsequent to determining whether the trust relation addition condition is fulfilled, determining whether the first certificate authority is enabled to issue a further digital certificate; and
   wherein, if the first certificate authority is enabled to issue a further digital certificate, the stopping, by the first certificate authority, to issue a further digital certificate and the enabling the second certificate authority to issue the at least one further digital certificate are performed; and
   wherein, if the first certificate authority is not enabled to issue a further digital certificate; the determining whether the revoking condition is fulfilled is performed.

8. The method of claim 2:
   wherein the at least one network node comprises a trust relation to the first certificate authority;
   further comprising, subsequent to the revoking, by the first certificate authority, the at least one digital certificate, removing the trust relation to the first certificate authority in the at least one network node.

9. The method of claim 3, wherein the establishing and/or the removing is performed by operation and maintenance means.

10. The method of claim 1, further comprising revoking the first certificate authority subsequent to the removing the trust relation in the at least one network node to the first certificate authority.

11. The method of claim 1, further comprising receiving, by the first certificate authority, a request for revoking the at least one digital certificate.

12. The method of claim 1:
   wherein at least one condition of the revocation condition is associated with at least one threshold; and
   wherein the determining whether the at least one revocation condition is fulfilled comprises:
      comparing a corresponding characteristic with the at least one threshold; and
      determining that the at least one revocation condition is fulfilled if the corresponding characteristic is equal to or above the at least one threshold.

13. The method of claim 1, wherein at least one condition of the revocation condition is related to at least one of:
   a length of a certificate revocation record in the first certificate authority for digital certificates having been revoked by the first certificate authority;
   a number of entries in the certificate revocation record in the first certificate authority;

an elapsed life time of the first certificate authority since a creation of the first certificate authority;
a remaining life time of the first certificate authority;
a number of digital certificates in the first certificate authority, the digital certificates being valid and being not revoked;
a ratio between digital certificates revoked by the first certificate authority and digital certificates issued by the first certificate authority;
the first certificate authority being compromised; and
an administrative reason affecting the first certificate authority selected from the group consisting of: a change of a name of the first certificate authority, a shutdown of the first certificate authority, a change of a platform of the first certificate authority, and maintenance work for the first certificate authority.

14. The method of claim 2:
wherein at least one condition of the trust relation addition condition;
wherein the determining whether the at least one trust relation addition condition is fulfilled comprises:
comparing a corresponding characteristic with the at least one threshold; and
determining that the at least one trust relation addition condition is fulfilled if the corresponding characteristic is equal to or above the at least one threshold.

15. The method of claim 2, wherein at least one condition of the trust relation addition condition is related to at least one of:
a length of a certificate revocation record in the first certificate authority for digital certificates having been revoked by the first certificate authority;
a number of entries in the certificate revocation record in the first certificate authority;
an elapsed life time of the first certificate authority since a creation of the first certificate authority;
a remaining life time of the first certificate authority;
a number of digital certificates in the first certificate authority, the digital certificates being valid and being not revoked;
a ratio between digital certificates revoked by the first certificate authority and digital certificates issued by the first certificate authority;
the first certificate authority being compromised; and
an administrative reason affecting the first certificate authority selected from the group consisting of: a change of a name of the first certificate authority, a shutdown of the first certificate authority, a change of a platform of the first certificate authority, and maintenance work for the first certificate authority.

16. The method of claim 1, the method further comprises determining whether a trust relation addition condition for adding a trust relation in at least one network node of the communication network to a second certificate authority is fulfilled, and if so:
stopping by the first certificate authority to issue further digital certificates;
creating the second certificate authority; and
enabling the second certificate authority to issue digital certificates; and
wherein the further digital certificate replaces a digital certificate revoked by the first digital certificate authority.

17. The method of claim 1,
wherein any given digital certificate binds a key to an identity of a network node; and
wherein the issuing comprises issuing one of the at least one further digital certificates to bind the same key to the same network node as one of the at least one digital certificate that is revoked.

18. The method of claim 1, wherein the unique identifier is a serial number of a digital certificate.

19. A method, in a controlling certificate authority, for handling digital certificates in a communication network, the controlling certificate authority comprising first and second certificate authorities, wherein the first certificate authority has issued at least one digital certificate, the method comprising:
determining whether a revocation condition for revoking the at least one certificate is fulfilled, the at least one digital certificate having been issued by the first certificate authority, the at least one digital certificate being valid and not presently revoked, and any given digital certificate that is not revoked is uniquely identified by a unique identifier;
based on a result of the determining:
trigger the first certificate authority to revoke the at least one digital certificate; and
trigger the second certificate authority to issue at least one further digital certificate to have a same unique identifier as one of the at least one digital certificate that is revoked.

20. The method of claim 19, further comprising:
receiving, from a network node of the communication network, a request for issuing the at least one further digital certificate, wherein the initiating the second certificate authority to issue the at least one further digital certificate is performed in response to the received request; and
sending the issued at least one further digital certificate to the at least one network node.

21. A method, in a network node, for handling digital certificates in a communication network, the network node maintaining a digital certificate issued by a first certificate authority of the communication network, the method comprising:
sending a request for issuing, by a second certificate authority of the communication network, a further digital certificate, wherein the request for issuing a further digital certificate comprises an identifier uniquely identifying the digital certificate issued by the first certificate authority, and the further digital certificate is identified by the same identifier in the request; and
receiving the further digital certificate, the further digital certificate having been issued by the second certificate authority, wherein the further digital certificate replaces the digital certificate issued and revoked by the first certificate authority.

22. The method of claim 21, wherein the same identifier is a serial number of the digital certificate issued by the first certificate authority.

23. A method, in a network managing node, for handling digital certificates in a communication network, the communication network comprising a first certificate authority having issued at least one digital certificate, the method comprising:
sending information, to a network node of the communication network for the network node, requesting a further digital certificate to be issued by a second certificate authority for a digital certificate;
wherein the information requesting a further digital certificate comprises an identifier uniquely identifying a digital certificate issued by the first digital certificate authority, and the further digital certificate comprises the same identifier in the request; and wherein the further digital certificate replaces the digital certificate, which is issued and revoked by the first certificate authority.

24. The method of claim 23, the same identifier is a serial number of the digital certificate issued by the first certificate authority.

25. A controlling certificate authority for handling digital certificates in a communication network, the controlling certificate authority comprising:
one or more processing circuits configured to function as first and second certificate authorities, wherein the first certificate authority has issued at least one digital certificate;
wherein the controlling certificate authority is configured to:
determine whether a revocation condition for revoking the at least one first digital certificate is fulfilled, the at least one digital certificate having been issued by the first certificate authority, the at least one digital certificate being valid and not presently revoked, and any given digital certificate that is not revoked is uniquely identified by a unique identifier;
based on a result of the determining, trigger the first certificate authority to revoke the at least one digital certificate; and
based on the result of the determining, trigger the second certificate authority to issue at least one further digital certificate to have a same unique identifier as one of the at least one digital certificate that is revoked.

26. A network node for handling digital certificates in a communication network, the network node maintaining a digital certificate issued by a first certificate authority of the communication network, the network node comprising:
one or more processing circuits configured to cause the network node to:
send a request for issuing, by a second certificate authority of the communication network, a further digital certificate, wherein the request for issuing a further digital certificate comprises an identifier uniquely identifying the digital certificate issued by the first digital certificate authority, and the further digital certificate is identified by the same identifier in the request; and
receive the further digital certificate, the further digital certificate having been issued by the second certificate authority, wherein the further digital certificate replaces the digital certificate issued and revoked by the first digital certificate authority.

27. A network managing node for handling digital certificates in a communication network, the communication network comprising:
a first certificate authority having issued at least one digital certificate; and
one or more processing circuits configured to cause the network managing node to send information, to a network node of the communication network for the network node, requesting a further digital certificate to be issued by a second certificate authority for a digital certificate; and
wherein the information requesting a further digital certificate comprises an identifier uniquely identifying a digital certificate issued by the first certificate authority, and the further digital certificate comprises the same identifier in the request; and
wherein the further digital certificate replaces the digital certificate, which is issued and revoked by the first certificate authority.

28. A computer program product stored in a non-transitory computer readable medium for controlling the handling of digital certificates in a communication network, the communication network comprising a first certificate authority having issued at least one digital certificate, the computer program product comprising software instructions which, when run on one or more processors of the communication network, causes the communication network to:
determine whether a revocation condition for revoking the at least one digital certificate is fulfilled, wherein:
the at least one digital certificate was issued by the first certificate authority;
the at least one digital certificate is valid and not presently revoked;
any given digital certificate that is not revoked is uniquely identified by a unique identifier;
based on a result of the determining:
revoke, by the first certificate authority, the at least one digital certificate; and
issue, by a second certificate authority, at least one further digital certificate to have a same unique identifier as one of the at least one digital certificate that is revoked.

29. The computer program product of claim 28, wherein a controlling certificate authority comprises the one or more processors and functions as the first and second certificate authorities.

* * * * *